(No Model.) 2 Sheets—Sheet 1.
L. V. HUE.
MANUFACTURE OF HOLLOW GLASSWARE.

No. 364,929. Patented June 14, 1887.

Attest:
H. N. Jesbera
S. F. Stavere

Inventor:
Leon Victor Hué
By David A. Burr
Att'y.

(No Model.) 2 Sheets—Sheet 2.

L. V. HUE.
MANUFACTURE OF HOLLOW GLASSWARE.

No. 364,929. Patented June 14, 1887.

Attest:
A. N. Jesbera
S. C. Stacen

Inventor:
Leon Victor Hue
By David A. Burr
Att'y.

UNITED STATES PATENT OFFICE.

LEON VICTOR HUE, OF PHILLIPSBURG, PENNSYLVANIA.

MANUFACTURE OF HOLLOW GLASSWARE.

SPECIFICATION forming part of Letters Patent No. 364,929, dated June 14, 1887.

Application filed August 26, 1886. Serial No. 211,876. (No model.)

*To all whom it may concern:*

Be it known that I, LEON VICTOR HUE, of Phillipsburg, Centre county, in the State of Pennsylvania, have invented a new and useful Improvement in the Manufacture of Internally Divided or Partitioned Hollow Glassware; and I do hereby declare that the following is a full and exact description thereof, reference being had to the accompanying drawings, and to the letters of reference marked thereon, making a part of this specification, in which—

Figure 1:
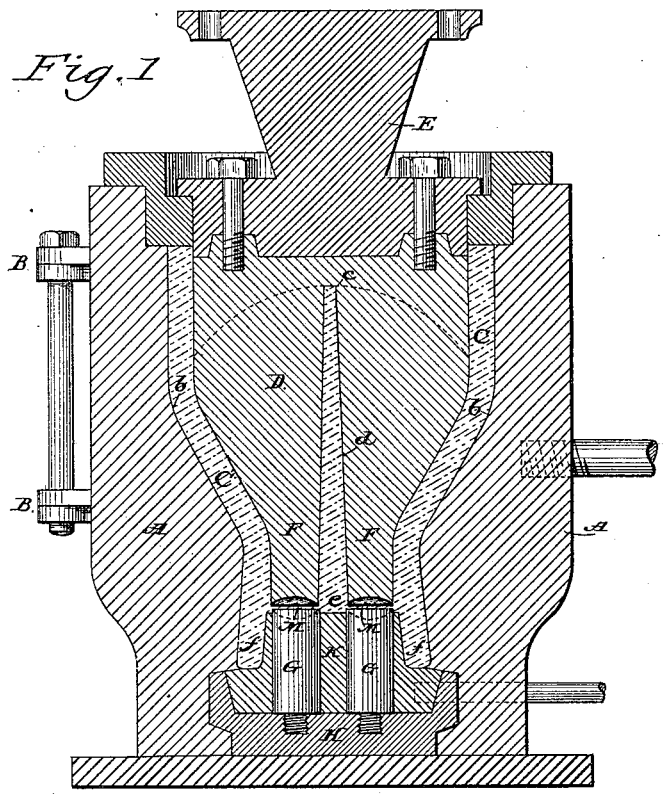
Figure 2:
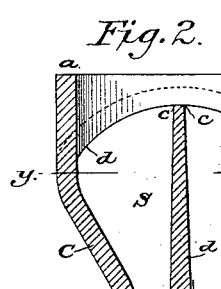
Figure 4:
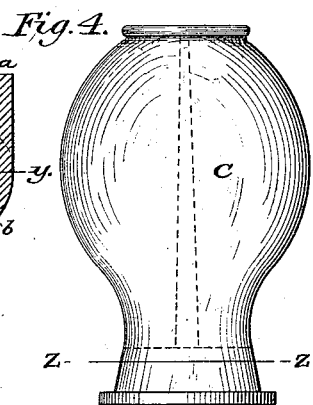
Figure 3:
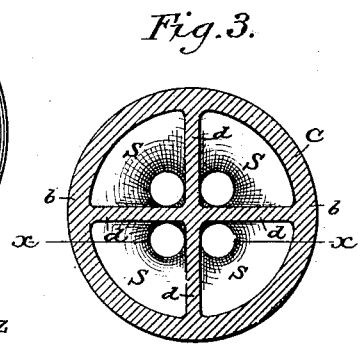
Figure 5:
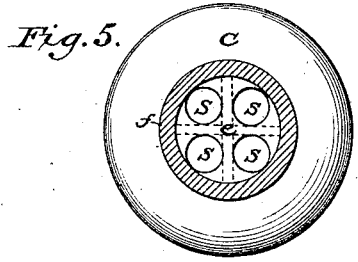
Figure 6:
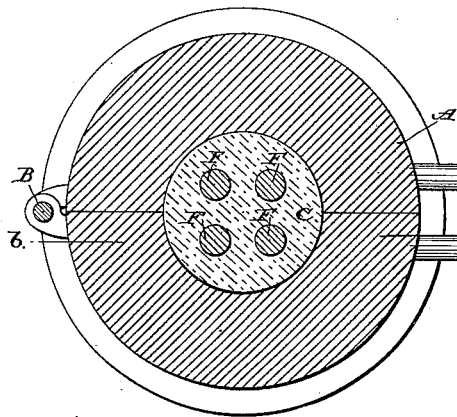
Figure 7:
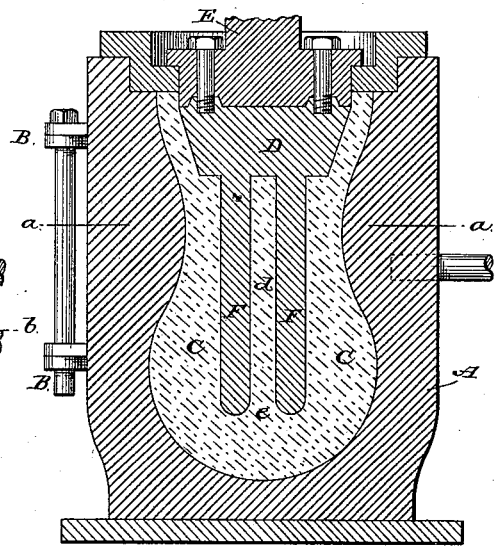
Figure 8:
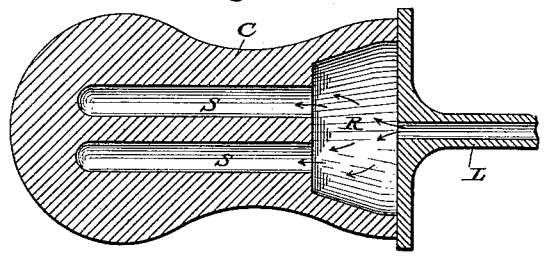
Figure 9:
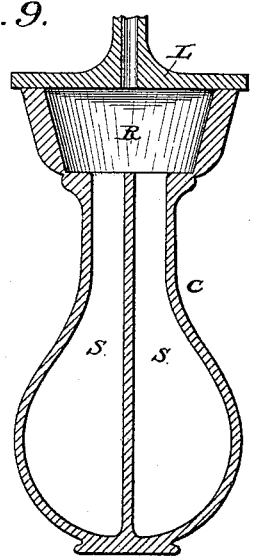
Figure 10:
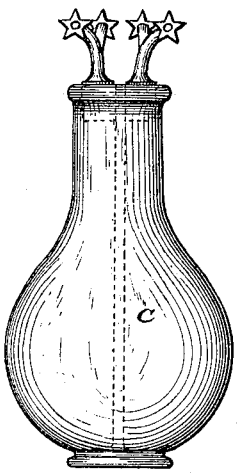

Figure 1 is a vertical section through the mold and plunger used in my improved process of manufacturing compartment bottles, flasks, or decanters, taken at one side of the center thereof, as indicated at line *x x* of Fig. 3; Fig. 2, a similar section of the partly-formed vessel when taken from the mold and attached to a blow-tube, in readiness, first, for closing the bottom of the vessel, and, second, for blowing it into its final finished form; Fig. 3, a cross-section in line *y y* of Fig. 2; Fig. 4, an elevation of the finished flask after it has been blown into form, and Fig. 5 a cross-section in line *z z* of Fig. 4 through the neck of the flask. Fig. 6 is a cross-section in line *a a* of Fig. 7; and Fig. 7 is a vertical section in line *b b* of Fig. 6, illustrating a modification in form of mold and plunger adapted to carry out my improved process. Fig. 8 illustrates in section the blank produced in the mold, Fig. 1, when attached to a blow-tube preparatory to blowing; Fig. 9, a similar view of the blank when blown in form and ready for detachment from the blowing-tube, and Fig. 10 an elevation of the finished flask thereby produced.

Similar letters indicate like parts in all of the figures.

My invention relates to the manufacture of bottles, decanters, flasks, vases, and other vessels which are divided internally in two or more separate and distinct compartments, each of which is formed with a mouth or opening communicating with a single opening or mouth in the neck of the vessel common to all.

It has for its object to so facilitate the manufacture of this description of glassware as greatly to reduce the cost thereof.

It consists in first molding a blank for the vessel in a mold by means of a slitted plunger, whereby the interior of the blank is divided by partitions into the number of compartments required, the transverse partitions being made to terminate in the neck of the blank a short distance from its outer end, and thereby leave a single space or chamber in said neck, into which all the compartments lead and open; and, second, in attaching the end of the neck of the blank or partly-formed vessel to a blowing-tube and blowing the vessel into the desired finished form, an equal distribution of the air to each compartment being produced and insured by reason of the single chamber or air-space in the neck, which is interposed between the opening into each compartment and the end of the neck attached to the blowing-tube.

It consists, furthermore, in the form and construction of the mold and its plunger, as hereinafter fully described, whereby a blank is produced divided into compartments, each of which communicates with a single air chamber or space at the outer end of the neck of the vessel, by means of which an equal distribution of air to each compartment is produced when the vessel is attached to a blowing-tube for the purpose of blowing it into its finished form.

In the accompanying drawings, A represents the body of the improved mold employed in my novel process of manufacturing bottles and other vessels which are divided into separate interior compartments. This body of the mold is divided, in the customary manner, into two halves or sections united to close together by a hinged joint, as at B. The interior of the mold is fashioned to conform to the exterior configuration of a vessel, C, of the general shape illustrated in Fig. 2.

D is the plunger, which, descending into the center of the mold, serves to displace the molten glass therein and to force it into the spaces left in and between the plunger and mold. This plunger is made fast, in the customary manner, to a movable head-piece, E, by which it is operated. The plunger is divided longitudinally by transverse slits or narrow diametric openings *d* into four fingers or separate longitudinal sections, two of which, F F, are shown in Figs. 1 and 7, and which intersect in the central axis of the plunger.

These openings terminate below the level of the circular concentric openings b b, left between the mold and the periphery of the plunger, as illustrated at c, but extend quite out to the lower end of the plunger, as shown at e. The plunger is made to descend into the mold so far as to bring the lower ends of the fingers F F near to the bottom thereof. In the modification of the invention illustrated in Figs. 1, 2, 3 the fingers terminate in the portion of the blank which is to constitute the neck of the flask or bottle, and are made to meet four counterpart steel rods, G G, projecting upward from a detachable base-block, H, fitted in the bottom of the mold A in the customary manner. The opposed ends of the fingers F F and rods G G are concaved or cup-shaped, as shown in Fig. 1, and their edges barely meet, so as to allow of a flow of the molten glass into the recesses thus formed between said ends. The interstices around the rods and between them and the mold A are filled in by a detachable piece, K, through which the rods extend, and which is fashioned to leave a circular space, f, within the mold, in continuation of the concentric space b b between the plunger and mold, and to close said space in shape to form the neck of the vessel to be fashioned therein.

In the manufacture of interiorly divided or partitioned bottles or other vessels by my improved process with the form of mold and plunger illustrated in Figs. 1 to 3, I first place within the matrix A, constructed as above described, a proper charge of molten glass, and by forcing down the longitudinally-slitted plunger D into the mold press the glass upward until it completely fills the concentric recesses b b and f f, the transverse diametric spaces d d, and the recesses between the ends F F of the plunger D and the ends of the pins G G. The plunger is then withdrawn, the mold opened, the bottom block, H, carrying the pins G G, withdrawn, the disks M M in the openings within the neck punched out through the openings in the piece K, and the blank (illustrated in Fig. 2) taken out and attached by the rim of its narrow end or chamber to a blowing-tube, L, in readiness for blowing. The removal of the disks M is facilitated by their form, the heavy central body thereof with the comparatively-thin edges permitting them to be easily broken away, leaving a clean surface in the neck at their point of attachment and severance. The outer rim, a a, of the blank is now properly heated and bent in toward the center and closed upon and united, as shown by the dotted lines in Fig. 2, with the outer ends, c, of the diametric partitions d d, thereby closing the recesses or pockets S S in the blank formed by the fingers of the plunger, and after heating the entire blank it is blown, by means of the tube L, into any desired form, the chamber R, Fig. 2, left between the ends e of the partitions in the neck of the vessel and the face of the blowing-tube, serving to permit and effect an equal distribution of the air-blast uniformly into each compartment, so that they shall all expand alike as the blowing is continued.

I contemplate in the manufacture of compartment-bottles, &c., by my invention dispensing with the need of closing an open end of the blank before blowing it, by causing the slitted plunger to enter the neck of the blank in the mold, as shown in Fig. 7, instead of the bottom thereof, as shown in Fig. 1, the air-distributing chamber in the neck of the blank, which constitutes the vital element in my invention, being formed directly by the head D of the plunger, (see Fig. 7,) instead of by a separate base-piece, K. (See Fig. 1.) The blank P, Fig. 8, is formed in the mold by the descent of the plunger therein until the fingers F F shall reach nearly to the bottom of the mold, as shown in Fig. 7, and the blank thus formed with a chambered neck, R, and four extended recesses, S S, extending inwardly therefrom, is attached to a blowing-tube, L, by cementing the rim of the chamber R thereto, as shown in Fig. 8, and, after heating the blank, it is blown, in manner as described, into the desired finished form. (See Figs. 9 and 10.) In either case a blank is first produced having a recess or chamber, R, at one end communicating with a series of pockets or recesses formed in the body of the blank by means of the slitted plunger, and this blank is attached, by the rim of the chamber R, to a blowing-tube, so that the air shall first enter the chamber, and be thence distributed in equal quantity and with equal pressure into the several pockets or recesses, to distend them. In the one case, however, the slitted plunger is made to enter the bottom end of the blank, and the chamber in its neck end is formed by an auxiliary base piece or block, as shown in Fig. 1, while in the other the slitted plunger enters the neck end of the blank, and the base of the plunger forms the chamber in said neck end, as shown in Fig. 7, thereby dispensing with the necessity of closing the bottom end by a separate step, as illustrated in Fig. 2.

I claim as my invention—

1. The process of manufacturing hollow glassware divided internally into separate compartments, which consists in first molding and fashioning the glass by means substantially as described into a blank having two or more closed recesses in the body thereof, each communicating with a single chamber in its neck end, and then attaching this chambered end of the blank to the blow-tube, and, after softening the glass, expanding the several recesses by means of air forced into and distributed from this single chamber into said separate recesses, substantially in the manner herein set forth.

2. In a mold for pressing glassware, the combination, with a plunger, D, adapted to enter the mold, and which is divided by one or more longitudinal slits or recesses intersecting its longitudinal axis into two or more separate prongs or fingers, of a base-block, H, provided with projecting rods G G, adapted to meet the prongs or fingers of the plunger end to end within the mold, substantially in the manner and for the purpose herein set forth.

In testimony whereof I have signed my name to this specification in the presence of two subscribing witnesses.

LEON VICTOR HUE.

Witnesses:
CHAS. B. HURST,
ALFRED HUE.